United States Patent
Cappellari et al.

(10) Patent No.: US 11,845,696 B2
(45) Date of Patent: Dec. 19, 2023

(54) DRY CONSTRUCTION COMPOSITION WET-SPRAYABLE BY MEANS OF A SCREW PUMP AND CONTAINING A BINDER AND A BIOSOURCED FILLER, AND PREPARATION AND USES OF SUCH A COMPOSITION

(71) Applicant: PAREXGROUP SA, Issy-les-moulineaux (FR)

(72) Inventors: Marco Cappellari, Saint Quentin Fallavier (FR); Lisa Desroses, Saint Quentin Fallavier (FR); Anne Daubresse, Saint Quentin Fallavier (FR)

(73) Assignee: PAREXGROUP SA, Issy-les-Moulineaux (FR)

( * ) Notice: Subject to any disclaimer, the term of this patent is extended or adjusted under 35 U.S.C. 154(b) by 26 days.

(21) Appl. No.: 15/772,198

(22) PCT Filed: Nov. 3, 2016

(86) PCT No.: PCT/FR2016/052855
§ 371 (c)(1),
(2) Date: Apr. 30, 2018

(87) PCT Pub. No.: WO2017/077246
PCT Pub. Date: May 11, 2017

(65) Prior Publication Data
US 2018/0312440 A1    Nov. 1, 2018

(30) Foreign Application Priority Data
Nov. 3, 2015   (FR) ..................................... 1560504

(51) Int. Cl.
*C04B 28/12*   (2006.01)
*C04B 40/06*   (2006.01)
(Continued)

(52) U.S. Cl.
CPC ............ *C04B 28/12* (2013.01); *C04B 18/146* (2013.01); *C04B 18/248* (2013.01); *C04B 24/16* (2013.01);
(Continued)

(58) Field of Classification Search
CPC ......... C04B 28/10; C04B 14/06; C04B 14/24; C04B 40/0608; C04B 7/323;
(Continued)

(56) References Cited

U.S. PATENT DOCUMENTS 2,083,961 A   6/1937  Gustave
5,034,160 A   7/1991  Kindt et al.
(Continued)

FOREIGN PATENT DOCUMENTS

AR       110109 A1    2/2019
CN       102603252 A   7/2012
(Continued)

OTHER PUBLICATIONS

Dec. 17, 2019 Office Action issued in Chilean Patent Application No. 201801176.
(Continued)

*Primary Examiner* — Brian Handville
(74) *Attorney, Agent, or Firm* — Oliff PLC

(57) ABSTRACT

A dry construction composition is easily wet-sprayable by means of a screw pump, thus forming, after hardening, a durably mechanically resistant insulating material ($\lambda < 0.1$ W·m−1·K−1). The composition contains: —A— at least one binder, itself including: —A1— at least one main binder containing lime and/or at least one alumina source and/or at least one calcium sulfate source, preferably at least one alumina source, —A2— at least one water-retaining agent, and —A3— preferably at least one surfactant; and —B— at least one biosourced filler, preferably of plant origin. The
(Continued)

ratio B/A (liters/kg) is between 2 and 9. The composition is intended to be mixed with water in a water/binder ratio —A— of no lower than 0.8. Also disclosed is a wet composition, the preparation thereof, to the binder —A— taken in isolation, and to a method of spraying the composition onto a horizontal or vertical substrate or by molding.

13 Claims, 1 Drawing Sheet

(51) Int. Cl.
| | |
|---|---|
| *C04B 28/10* | (2006.01) |
| *C04B 18/14* | (2006.01) |
| *C04B 18/24* | (2006.01) |
| *C04B 24/16* | (2006.01) |
| *C04B 24/38* | (2006.01) |
| C04B 111/00 | (2006.01) |
| C04B 111/52 | (2006.01) |
| C04B 111/28 | (2006.01) |
| B28B 1/32 | (2006.01) |
| C04B 103/40 | (2006.01) |
| C04B 103/44 | (2006.01) |
| C04B 103/46 | (2006.01) |

(52) U.S. Cl.
CPC ............ *C04B 24/383* (2013.01); *C04B 28/10* (2013.01); *C04B 40/065* (2013.01); *B28B 1/32* (2013.01); *C04B 2103/40* (2013.01); *C04B 2103/44* (2013.01); *C04B 2103/465* (2013.01); *C04B 2111/00172* (2013.01); *C04B 2111/00517* (2013.01); *C04B 2111/00577* (2013.01); *C04B 2111/00698* (2013.01); *C04B 2111/28* (2013.01); *C04B 2111/52* (2013.01); *C04B 2201/30* (2013.01); *Y02W 30/91* (2015.05)

(58) Field of Classification Search
CPC .............. C04B 18/248; C04B 2103/40; C04B 2103/44; C04B 18/24; C04B 18/26; C04B 18/265; C04B 2103/0082; C04B 2103/0088; C04B 18/146; C04B 24/16; C04B 24/383; C04B 14/104; C04B 24/38; C04B 2103/12; C04B 2103/22; C04B 2103/46; C04B 2103/65; C04B 22/143; C04B 40/0039; C04B 7/32; C04B 2103/465; C04B 2111/00172; C04B 2111/00517; C04B 2111/00577; C04B 2111/00698; C04B 2111/28; C04B 2111/52; C04B 2201/30; C04B 28/12; C04B 40/065; B28B 1/32; Y02W 30/94; Y02W 30/97

See application file for complete search history.

(56) References Cited

U.S. PATENT DOCUMENTS

| | | | |
|---|---|---|---|
| 2007/0054059 A1* | 3/2007 | Nakashima | ........... C04B 22/126 106/815 |
| 2014/0371351 A1 | 12/2014 | Pantin et al. | |
| 2017/0022110 A1 | 1/2017 | Ulrike et al. | |

FOREIGN PATENT DOCUMENTS

| | | | | |
|---|---|---|---|---|
| CN | 102603352 | A | 7/2012 | |
| CN | 103664092 | A | 3/2014 | |
| CN | 104016627 | A | 9/2014 | |
| CN | 104159866 | A | 11/2014 | |
| DE | 195 05 989 | A1 | 8/1996 | |
| DE | 196 10 247 | A1 | 2/1997 | |
| EP | 0 983 978 | | 3/2000 | |
| EP | 2 216 306 | | 8/2010 | |
| EP | 2404885 | A2 | 1/2012 | |
| EP | 3 031 868 | A1 | 6/2016 | |
| FR | 384903 | A | 4/1908 | |
| FR | 2 923 242 | | 5/2009 | |
| FR | 2 942 795 | | 9/2010 | |
| FR | 2 957 016 | | 9/2011 | |
| FR | 2 997 944 | | 5/2014 | |
| FR | 3 016 377 | | 7/2015 | |
| FR | 3034415 | A | 10/2016 | |
| GB | 2 522 758 | A | 8/2015 | |
| JP | H09-12379 | A | 1/1997 | |
| WO | 94/15886 | | 7/1994 | |
| WO | 2008/035197 | A2 | 3/2008 | |
| WO | WO-2013131583 | A1 * | 9/2013 | ............. C04B 28/02 |
| WO | 2014/162097 | | 10/2014 | |
| WO | 2015/082515 | | 6/2015 | |
| WO | 2015/082585 | A1 | 6/2015 | |
| WO | 2016/051085 | A1 | 4/2016 | |

OTHER PUBLICATIONS

Jul. 10, 2019 Office Action issued in Singaporean Patent Application No. 11201803739Y.
Mar. 24, 2020 Translation of Office Action issued in Brazilian Patent Application No. BR112018008654-1.
"Renders & Plasters," Tradical building lime innovation, Lhoist UK, 2016, url: www.tradical.co.uk.
May 27, 2020 Office Action (Philippines) issued in Patent Application No. 1/2018/500951.
Magnion, Camille et al. "Use of plant aggregates in building ecomaterials". European Journal of Environmental and Civil Engineering, vol. 16, pp. s17-s33, 2012.

* cited by examiner

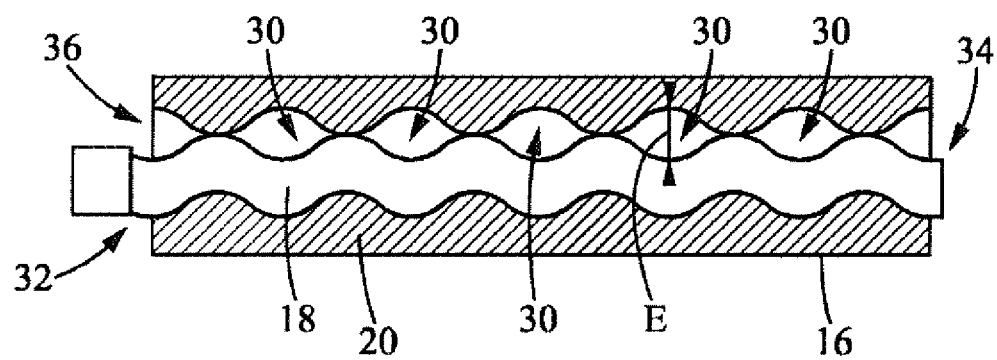

DRY CONSTRUCTION COMPOSITION WET-SPRAYABLE BY MEANS OF A SCREW PUMP AND CONTAINING A BINDER AND A BIOSOURCED FILLER, AND PREPARATION AND USES OF SUCH A COMPOSITION

TECHNICAL FIELD

The technical field of the invention is that of construction compositions that are dry, wet and hardened; usable in building; applicable onto horizontal surfaces by spreading, onto vertical surfaces by spraying, and/or suitable for the production of moulded objects in moulds or formwork.

These compositions contain aggregates and fillers suitable for being agglomerated, or agglomerated by at least one binder. Conventionally, these compositions are concretes or mortars.

The binders are mineral and/or organic, and preferably mineral.

The construction compositions more specifically addressed are those that comprise in addition to and/or instead of mineral aggregates, fillers originating from the biosourced materials sector, i.e. from biomass of plant or animal origin, preferably of plant origin.

The invention also relates to a specific binder formulation suitable for biosourced fillers, preferably of plant origin.

The invention also relates to wet forms of these compositions and the preparation thereof, and to the application thereof in building.

The construction elements obtained from the aforementioned compositions also form an integral part of the invention.

TECHNOLOGICAL BACKGROUND

In the current regulatory and political climate of reducing the environmental footprint of buildings, reducing the consumption of fossil raw materials, limiting greenhouse gas emissions and promoting sustainable development economics, the use of biosourced plant aggregates/fillers in construction compositions is becoming increasingly widespread.

Plant raw materials already used in the field of building and construction include in particular: plant fibre wools, recycled natural textiles, cellulose wadding, hemp straw or hemp chaff, other forms of hemp, flax shives, baled or compressed straw, all forms of wood, etc.

These plant raw materials are known for their thermal and sound insulating properties and for their strengthening, filling and matrix-forming properties.

The use of such plant raw materials in construction compositions does however raise a certain number of difficulties, comprising:

A very significantly hydrophilic and hyperabsorbent property, resulting in excess water;
the excess water extends the drying time and delays curing;
the excess water has an impact on the mechanical strength of the hardened compositions (e.g. compressive strength);
the excess water affects the durability of the hardened compositions;
the excess water promotes the development of microorganisms, which degrade the sanitary quality of the hardened compositions.

Plant aggregate/fillers are generally characterized by a high water absorption capacity linked to their highly porous structure. Hemp chaff, an aggregate/filler made from hemp stems, is capable of absorbing a quantity of water up to 3-4 times its weight. Once in contact with a mineral binder paste, the plant aggregates/fillers absorb some of the mixing water, adversely affecting the hardening kinetics of the mortar. Aggregates/fillers of this type require high water ratios, resulting in long drying times for the insulating mortar.

The inventions forming the subject matter of the prior art patent applications mentioned below raise problems resulting from the incorporation of plant raw materials into construction compositions.

Patent application WO03004435 states that the incorporation of hemp derivatives into concrete or mortar poses a very serious problem due to the highly hydrophilic nature of the hemp component. This hemp component can absorb up to approximately 400% of its weight of water or aqueous liquid, which introduces a very strong concurrent reaction with the water contained in the mortar or concrete.

Patent application WO03004435A1 proposes responding to this problem with no detrimental effect on the drying and setting characteristics of the wet formulations, and without affecting the mechanical properties of the hardened products resulting from said formulations. To this end, it discloses formulations for hemp concrete and mortar, comprising:

hemp components (and/or flax and/or cereal straw, such as oat husk or rice husk),
a binder, totally or partially constituted by air lime;
at least one additive for forming very fine pores and capillaries forming a microcapillary system, so that the capillary water can be discharged to the surface during curing and then drying while, after drying, external water (rain) is unable to penetrate this network of capillaries; (plant colloids such as alginates and/or polysaccharides and all derivatives of natural or synthetic starches and/or carrageenates);
and at least one matrix hydrophobization additive (calcium, sodium or magnesium polysulphonates, lignosulphonates; sodium sulphates, heavy-metal soaps, maleates, oleates (Na), aluminium, magnesium, sodium or lithium stearates, sodium siliconates).

The very slow hardening kinetics (longer than 24 hours) of these formulations mean that it is not possible to apply several coating layers to a substrate within application times compatible with building productivity requirements. The operator must wait too long between each layer (pass), i.e. more than one day, which is prohibitive, in particular due to the cost of keeping scaffolding in place.

In addition, these wet formulations cannot be pumped by means of a screw pump due to the large volumes of hemp that they contain. The suitability for pumping, or "pumpability", by means of a screw pump, is an essential condition for enabling the application by spraying of these wet formulations of hemp concrete and mortar onto substrates (walls, façades, ceilings, floors, etc.). Almost all operators' (renderers') spraying machines are fitted with screw pumps. This means that mortar manufacturers must offer mixed formulations that are suitable for passing through a standard screw pump.

The use of plant aggregates/fillers such as hemp in the formulations according to WO03004435A1 poses a problem of blocking/clogging of the screw pumps, since these formulations contain sufficiently large volumes of hemp to ensure low thermal conductivity (lambda), for example less than 0.1 W/m·K, and meet the thermal insulation performance requirements.

The formulations according to WO03004435A1 do not fulfil this compromise between, on the one hand, a sufficient dry volume of hemp with respect to the binder to obtain the thermal insulation required and on the other hand, the pumpability necessary for the application of the wet formulations.

In addition, the hardened products obtained from these known wet formulations do not have good "durability" to ageing cycles (EOTA external thermal insulation standard ETAG 004).

Patent application WO2014001712A1 discloses construction materials that are presented as being easily prepared from a plant aggregate and having excellent thermal and sound insulation properties, as well as a setting, hardening and drying time that limits the occurrence of the phenomena of degradation of said material generally observed with construction materials prepared from a plant aggregate. These construction materials comprise:

- 10% to 60% hydraulic binder and/or air-cured binder (Vicat CNP PM—quick setting natural cement, optionally air lime);
- 16% to 50% plant aggregate: seminal hairs of the seeds, in particular cotton, bast fibres originating from plant stems such as hemp fibre, hemp chaff, flax shives, wood chips, cork or miscanthus beads; fibres extracted from the leaves or trunk, in particular sisal; and the husks of fruit such as the coconut (hemp fibre, hemp chaff, flax shives and wood chips);
- 0.05% to 5% water-retaining agent selected from the cellulose ethers (methyl hydroxyl ethyl cellulose);
- 10% to 50%, preferably 20% to 40%, water;
- optionally, citric acid;
- optionally, sodium carbonate.

The construction materials of the examples (concretes) are prepared by means of a planetary mixer and then compacted in cylindrical moulds. The composition and preparation thereof make it possible to limit the quantity of mixing water: 20 to 40%.

These construction materials contain large volumes of plant aggregates/fillers and cannot be pumped, in wet form, in a screw pump. As a result, these construction materials cannot be applied by pumping by means of a screw pump and spraying (rendering type machine).

This inability to be applied by pumping by means of a screw pump also arises from the fact that these materials are quick setting, as shown in the examples in WO2014001712A1, according to which the setting times are less than one hour, which is incompatible with passing through a spraying machine.

In order to improve the construction compositions in which plant additives are incorporated into a lime-based binder matrix (for example hemp, to produce blocks such as Chanvribloc®), said compositions requiring very long hardening times, which delay the setting of the hydraulic binders, patent application FR2997944A1 describes hemp concrete compositions comprising:

- a hydraulic binder (Portland cement, Ciment Fondu®, sulphoaluminate cement, calcium aluminate cement, hydraulic lime, air lime); in particular Portland cement, Ciment Fondu®;
- plant aggregates formed from hemp chaff (hemp), maize cob, sorghum, flax skives, miscanthus (elephant grass), rice hulls (rice husks), cane bagasse, cereal straw, kenaf, coconut, olive stones, bamboo, wood pellets (for example spruce chippings), wood chips and mixtures thereof;
- trivalent cations (iron salts—iron chloride or nitrate—or aluminium salts);
- a calcareous filler;
- a surfactant foaming agent;
- optionally, a hydraulic binder setting agent (calcium/lithium salts);
- optionally, a water-reducing agent, a plasticizer or a superplasticizer;
- and water; the water/binder weight ratio being comprised between 0.3 and 2.5.

These compositions do not comprise a water retaining agent and have insufficient water retention to enable application by pumping by means of a screw pump without resulting in removal of water from the wet material, which causes the blocking/jamming of the screw pump. These compositions cannot therefore be pumped with a screw pump and are not wet-sprayable. They are intended for application by pouring.

In addition, the insulating compositions (renders, mortars, concretes, etc.) marketed under the TRADICAL® brand by BCB are known. These compositions comprise an air lime-based mineral binder and a hemp filler branded CHANVRIBAT® 75. Depending on the recommended proportions, these compositions comprise between 44 and 165 kg of binder per 200 litres of hemp chaff. These compositions can be applied by pouring, compacting or dry or semi-wet spraying, but cannot be applied by wet spraying with a screw pump.

The construction compositions with biosourced aggregates/fillers according to the prior art mentioned above are not compatible with wet application methods, which require that the wet composition be pumpable and sprayable onto any type of substrate, vertical, sloping or horizontal.

These wet application methods ensure improved homogeneity and repeatability, while minimising the loss of aggregates/fillers by rebound from the sprayed surface. They are in particular widely used by operators, known as renderers, to apply façade render, and consist of pumping and spraying a homogeneous mixture composed of a formulated binder, an aggregate/filler and all of the mixing water. The universally widespread renderers' spraying machines are eccentric screw pumps with a 2L6 or 2R6 pump jacket found on machines such as the Putzmeister S5, SP5, SP11, Bunker S8, S28R, S38, Lancy PH9B or PH9B-R or Turbosol Talent DMR. The dimensions of these jackets make it difficult for insulating mortars, with a biosourced aggregate/filler larger than 10 mm, for example mortars the aggregates/fillers of which are composed of hemp chaff labelled as "hemp chaff for building", to pass through.

Wet methods require a specific formulation. The binder must enable the pumping of the plant mortar (for example hemp mortar) without phase separation (removal of water from the biosourced aggregate/filler compressed in the jacket) and ensure the slump resistance of the mortar on the substrate (preventing creep of the mortar on application to vertical surfaces).

There are also insulating plant mortars that are applied, either manually or mechanically, by means of specific pumping and spraying methods. These methods, known as "dry" and "semi-wet" require specific, sometimes costly, machines. However, these methods do not guarantee the homogeneity of the mortar and a satisfactory coating of the plant fibres, and have a negative impact on its resistance to climatic changes, and make it vulnerable to microorganisms, rodents and fire. Such methods have been developed mainly for hemp chaff-based mortars in order to reduce the quantity of mixing water. According to these methods, the plant aggregate/filler is propelled to the spray gun dry, and the aggregate/filler is coated at the outlet or inside the spray gun. The end properties and homogeneity of the sprayed mortar are significantly affected by the machine settings, the distance between the gun and the wall during spraying and the weather conditions. These methods generate significant aggregate/filler loss by rebound from the substrate (approximately 10-20%). This spraying method does not ensure optimum repeatability for the application of insulating mortar coatings on vertical substrates.

To date, and to the inventors' knowledge, no insulating plant aggregate/filler-based mortar/concrete (biosourced material) with thermal conductivity (λ) less than or equal to 0.2, preferably 0.1 W/m·K, has been developed for wet application, using screw pump spraying machines, such as rendering machines.

AIMS OF THE INVENTION

In the absence of insulating plant aggregate/filler-based mortar/concrete that is pumpable and wet-sprayable for the application of render to building substrates (vertical, horizontal or sloping), in particular for the thermal renovation of the façades, for the application of insulating screeds to horizontal building substrates, for filling insulating partitions, in particular in timber-framed houses, or also for the production of insulating prefabricated elements, the invention aims to meet at least one of the following aims:
providing a dry mortar/concrete composition, comprising plant raw materials, wet-sprayable by means of a screw pump, and enabling the production of an insulating mortar/concrete with low thermal conductivity (λ);
providing a dry mortar/concrete composition, comprising plant raw materials, wet-sprayable by means of a screw pump, enabling the production of an insulating mortar/concrete, with rapid hardening, without delayed setting, for example enabling the "recoatability" of 3 cm passes every 24 hours (multiple coats can be applied within periods compatible with the productivity required for construction sites in the building field);
providing a dry mortar/concrete composition, comprising plant raw materials, wet-sprayable by means of a screw pump, enabling the production of an insulating mortar/concrete, and resulting in hardened products having durable mechanical performance, even in severe meteorological conditions, for example freeze-thaw cycles or humidity-freeze cycles, from 28 days following application;
providing a dry mortar/concrete composition, comprising plant raw materials, wet-sprayable by means of a screw pump, enabling the production of an insulating mortar/concrete, in particular having limited vulnerability to deterioration caused by the development of microorganisms, rodent attack or even fire;
providing a dry mortar/concrete composition, comprising plant raw materials, wet-sprayable by means of a screw pump, enabling the production of an insulating mortar/concrete, ensuring homogeneity of the material, both in the wet state and in the hardened dry state, through thorough coating of the particulate fillers, so as to provide good insulating performance in thermal and acoustic terms;
providing a dry mortar/concrete composition, comprising plant raw materials, enabling the production of an insulating mortar/concrete and wet-sprayable by means of a screw pump, without wastage of the composition due to rebound from the substrate;
providing a dry mortar/concrete composition, comprising plant raw materials, enabling the production of an insulating mortar/concrete and wet-sprayable by means of a screw pump, that provides a homogeneous deposit on the substrate, in a repeatable manner;
providing a wet mortar/concrete composition, comprising the dry composition mentioned in the aims above and water, wet-sprayable by means of a screw pump, that meets at least one of the aims above;
providing a binder for use in the dry composition mentioned in the aims above that meets at least one of the aims above;
providing a kit comprising the binder and the plant filler for use in preparing the dry composition mentioned in the aims above that meets at least one of the aims above;
providing a method for the production of an insulating mortar/concrete that meets at least one of the aims above.

BRIEF DESCRIPTION OF THE INVENTION

These and other aims are achieved by the present invention, a first aspect of which relates to a dry mortar composition, wet-sprayable, in particular by means of a screw pump, enabling the production of an insulating mortar characterized in that:
(i). it comprises:
—A— at least one binder, itself comprising:
—A1— at least one primary binder comprising lime and/or at least one alumina source and/or at least one calcium sulphate source, preferably at least one alumina source;
—A2— at least one water-retaining agent;
—A3— preferably at least one surfactant;
—B— at least one biosourced filler, preferably of plant origin;
the ratio B/A—volume of dry filler B in litres/mass of dry binder A in kg—being comprised between—in increasing order of preference—2 and 9; 2.5 and 8; 4 and 7.9; 4.6 and 7.5 L/kg;
(ii). it is intended to be mixed with a liquid, preferably water, with a water/A weight ratio comprised between 0.8 and 5, preferably between 1 and 4, and even more preferably between 1.5 and 3.5;
(iii). once mixed, it is pumpable in a screw pump as defined in a test T1, defined below.

It is to the inventors' credit that they have developed this dry composition, the precursor to a wet formulation capable of being pumped and sprayed, in particular with a screw pump of the type fitted to, for example, renderers' spraying machines, without losing the insulating property sought for these mortars.

In addition to the pumpability of the wet formulation, the composition according to the invention meets a "sprayability" specification, that is, for example, that said wet formulation, when it is sprayed and applied in a layer approximately 5 cm thick, to a vertical substrate made from concrete blocks, holds on this vertical substrate, without creep or flow, for the time necessary for the hardening and bonding thereof in hardened form to the vertical substrate, at an ambient temperature of comprised for example between 5° C. and 35° C. and at a relative humidity RH comprised between 20 and 90 percent.

Preferably, and still with a view to improving the wet application and pumping thereof in a sufficient time for it to be compatible with the requirements of construction, this composition is characterized, once mixed with a liquid—preferably water—with a water/A weight ratio comprised between 0.8 and 5, by a setting time, measured using a method M1, comprised between 1 and 24 hours, preferably between 1 and 8 hours.

According to another aspect thereof, the invention relates to a binder A comprising—in dry weight/weight % and in increasing order of preference—:
—A1— primary binder: [5-95]; [10-85]; [15-75];
of which:
lime: [10-95]; [20-70]; [30-60];
alumina source and/or calcium sulphate source: [0-90]; [5-30]; [7-15];
—A2— water-retaining agent: [0.1-5]; [0.5-3]; [0.82];
—A3— surfactant [0-2]; [0.01-1]; [0.05-0.5];
—A4— secondary binder [0-85]; [5-50]; [7-15];
—A5— lubricating mineral filler with a particle size d90 less than 100 μm: [0-40]; [0-30]; [0-20];
—A6— mineral spacing filler with a particle size d90 greater than or equal to 100 μm: [0-40]; [0-35]; [0-30];
—A7— water-repellent additive: [0-1.5]; [0-1]; [0-0.5];
—A8— setting retarder additive: [0-3]; [0-2]; [0-1];
—A9— accelerating additive: [0-3]; [0-2]; [0-1];
—A10— thickening additive: [0-2]; [0.1-1]; [0.2-0.8].

According to another aspect thereof, the invention relates to a kit comprising the binder (A) and one or more biosourced fillers (B), preferably of plant origin, of the dry composition according to the invention.

According to another aspect thereof, the invention relates to a wet mortar composition obtained, in particular from the composition according to the invention, pumpable in a screw pump with an air gap (E) between the rotor and stator of between 4 and 30 mm, and preferably with a 2L6 or 2R6 jacket.

According to another aspect thereof, the invention relates to a hardened mortar obtained from the wet composition according to the invention as set out above.

According to another aspect thereof, the invention relates to an External Thermal Insulation (ETI) or Internal Thermal Insulation (ITI) system comprising hardened mortar according to the invention as set out above and applied in layer(s) over a total thickness comprised between 2 and 30 cm, preferably between 5 and 15 cm, and coated with a waterproof render of a minimum thickness of 10 mm, characterized in that the hardened mortar comprises lime and at least one alumina source and in that said system meets the test for ETI in accordance with EOTA standard ETAG 004.

Finally, the invention also relates to a method for applying an insulating mortar comprising the following steps:
1. preparing a mixture of liquid (preferably water) and the dry composition as set out above, i.e. comprising the binder (A) and the biosourced filler (B), in a water/binder (A) weight ratio that is given below, on an increasing scale of preference:
[Water/A]≥0.8; [Water/A]≥1.0; [Water/A]≥1.5; 0.8≤[Water/A]≤5; 1≤[Water/A]≤4; 1.5≤[Water/A]≤3.5;
2. preferably, pumping the mixture prepared in step 1 by means of a screw pump,
3.1. spraying the mixture prepared in step 1 onto a vertical or sloping substrate, or to fill a timber- or metal-framed structure on site, or to produce prefabricated walls; or
3.2. spraying and spreading the mixture on a horizontal surface to form a screed; or
3.3. pouring the mixture prepared in step 1 into formwork to produce a wall, to fill between two partitions, or into a mould to produce a prefabricated element, in particular blocks or pre-walls or panels.

Definitions

Throughout the present description, all singulars equally denote the singular or the plural.

The definitions given below by way of example can be used to interpret the present description:
"mortar" or "concrete" denotes either a dry or wet or hardened mixture of one or more organic and/or mineral binders, fillers of mineral and/or plant origin and optionally fillers and/or admixtures and/or additives;
"insulating" mortar: denotes a class T "thermally insulating rendering mortar" in accordance with EN 998-1 or a concrete in the form of a coat the thermal conductivity λ of which, measured after complete drying according to the so-called hot plate method of NF EN 12664, is less than or equal to—in W/m·K and in increasing order of preference—0.2; 0.15; 0.12; 0.1; 0.08; 0.07;
"complete drying" means a stabilization of the mass of the hardened mortar to within 3% over 24 hours, with storage at 50% relative humidity;
The "size" of the particles of the biosourced filler (B) corresponds to the largest of the three dimensions of each particle;
A particulate filler has a size of less than or equal to X mm if its d90 is less than or equal to X mm; the term "d90" refers in this description to the particle size criterion whereby 90% of the particles are smaller than "d90". The particle size is measured by sieving in accordance with EN 12192-1;
"approximately" or "substantially" means to within 10%, or to within 5%, with respect to the unit of measurement used;
"polymer" denotes equally well "homopolymer" and "copolymer" and/or a mixture of polymers;
"light filler" is a filler with an apparent density of less than or equal to 750 kg/m$^3$, and preferably less than 500 kg/m$^3$;
"liquid": water or aqueous dispersion, aqueous emulsion or aqueous solution;
"comprised between Z1 and Z2" means that one and/or the other of the limits Z1, Z2 is included or not in the range [Z1, Z2].
"recoatability" is the minimum time necessary before the application of a fresh coat of wet mortar formulation on a previous coat of this wet formulation that has hardened. This minimum time corresponds to a compressive strength of the hardened previous coat that is greater than or equal to 0.1 MPa.

DETAILED DESCRIPTION OF THE INVENTION

Binder —A—

The binder —A— according to the invention is generally mineral and comprises at least one primary binder A1 and optionally a secondary binder —A4— different from the binder —A1—

—A1— Primary Binder

The primary binder —A1— comprises lime and/or one alumina source and/or one calcium sulphate source.

According to a preferred embodiment of the invention, the primary binder A1 comprises lime and at least one alumina source.

In a remarkable variant of this preferred embodiment, the dry weight ratio [(alumina source)/(lime)] is less than or equal to—in increasing order of preference—2.3; 2.1; 1.9; 1.7; 1.5; 1.3; 1.1; 0.9.

The lime is an air lime and/or hydraulic lime.

The air lime in question is of the type that complies with NF EN 459-1, preferably selected from the group comprising—ideally constituted by—:

a calcium air lime (CL) containing calcium oxide (CaO) and/or calcium hydroxide (Ca(OH)$_2$), the sum of CaO+MgO of which is at least 70% and the MgO content is <5%;

dolomite lime (DL) containing magnesium calcium oxide (CaO MgO) and/or magnesium calcium hydroxide (Ca(OH)$_2$Mg(OH)$_2$), the sum of CaO+MgO of which is at least 80% and the MgO content of which varies from 5% to more than 30%;

or mixtures thereof.

The air lime can be in various forms such as a paste, a powder or, for quick lime, the rock itself.

The hydraulic lime in question is of the type that complies with NF EN 459-1. Any mixture of lime of any type whatever, in any form whatever, can contain the composition according to the invention.

The alumina source is preferably selected from the following species: calcium aluminate cements (CAC), calcium sulphoaluminate (CSA) cements, binders with high alumina-rich cementitious phase content or mixtures of these species used alone or in a mixture.

According to a variant, the alumina source is selected from the following species: quick-setting cements (for example natural quick-setting cements), geopolymer cements, slag, calcium aluminate cements (CAC), calcium sulphoaluminate (CSA) cements or mixtures of these species used alone or in a mixture.

According to another variant, the alumina source is selected from the hydraulic binders comprising:

at least one phase selected from $C_3A$, CA, $C_{12}A_7$, $C_{11}A_7CaF_2$, $C_4A_3\$$ (Ye'elimite), $C_2A_{(1-x)}F_x$ (where C→CaO; A→Al$_2$O$_3$; F→Fe$_2$O$_3$ and x belonging to ]0, 1]), hydraulic amorphous phases having a molar ratio C/A comprised between 0.3 and 15, and such that the combined Al$_2$O$_3$ content of these phases is comprised between:

3 and 70% by weight of the total of the hydraulic binder, preferably between 7 and 50% by weight, even more preferably between 20 and 30% by weight.

CACs are cements containing a $C_4A_3\$$, CA, $Cl_2A_7$, $C_3A$ or $C_{11}A_7CaF_2$ mineralogical phase or mixtures thereof, such as for example Ciments Fondu®, sulphoaluminate cements, calcium aluminate cements in accordance with European Standard EN 14647 of December 2006, the cement obtained from the clinker described in patent application WO2006/018569 or mixtures thereof.

Sulphoaluminate clinkers are obtained from a mixture of calcium carbonate in calcareous form, bauxite or another alumina source (for example dross type by-product) and calcium sulphate, which is either gypsum, anhydrite or hemihydrate or mixtures thereof. The specific constituent at the end of the production process is Ye'elimite, $C_4A_3\$$. In particular, quick-setting cements or sulphoaluminate cements with Ye'elimite contents comprised between 3% and 70% can be used, as may be sold by Vicat, Italcementi, Lafarge-Holcim, Polar Bear, Liu Jui, Readerfast.

For example a quick-setting natural cement is constituted by a clinker containing:
  0% to 35% $C_3S$;
  10% to 60% $C_2S$;
  1% to 12% $C_4AF$;
  1% to 10% $C_3A$;
  5% to 50% $CaCO_3$ (calcite);
  10% to 15% $Ca_5(SiO_4)_2CO_3$ (spurrite);
  3 to 10% sulphate phases: Ye'elimite ($C_4A_3\$$), Langbeinite $K_2Mg_2(SO_4)_3$, anhydrite (C\$); and
  10 to 20% lime, periclase, quartz and/or one or more amorphous phases.

According to another variant, the alumina source is selected from hydraulic binders having an alumina content (expressed as Al$_2$O$_3$) comprised within the following ranges—in dry weight % and in increasing order of preference—[20; 70]; [25; 65]; [30; 72]; [35; 58].

Advantageously, the calcium sulphate source is selected from the anhydrites, gypsums, calcium hemihydrates, supersulphated cements and mixtures thereof. The natural or synthetic calcium sulphate source is selected from the anhydrites, gypsums, calcium hemihydrates or mixtures thereof used alone or in a mixture.

—A2— Water-Retaining Agent

Preferably, the water-retaining agent —A2— has a water retention greater than or equal to—in increasing order of preference—50, 60, 70, 80, 90%, according to the retention measuring method M2, this water-retaining agent preferably being selected from the polysaccharides, and even more preferably from the group comprising, or even better constituted by, the cellulose or starch ethers and mixtures thereof; the -uloses, hydroxyethyl celluloses, hydroxypropyl celluloses, methyl hydroxypropyl celluloses, methyl hydroxyethyl celluloses and mixtures thereof; modified or unmodified guar ethers and mixtures thereof; or a mixture of these different species.

The water-retaining agent A2 preferably has a 2% viscosity in water, measured using a Haake Rotovisco RV100 viscometer, shear rate of 2.55 s$^{-1}$ at 20° C., comprised between 5,000 and 70,000 cP, preferably between 20,000 and 50,000.

The water-retaining agent A2 has the property of retaining the mixing water before setting. The water is thus kept in the mortar or concrete mixture, which gives it a very good bond and good hydration. To a certain extent, it is absorbed less into the substrate, surface salting is limited and there is thus little evaporation.

—A3— Surfactant

The surfactants are preferably selected from:
i. sources of anionic surfactants, such as for example, alkyl sulphates, alkyl ether sulphates, alkaryl sulphonates, alkyl succinates, alkyl sulpho-succinates, alkoyl sarcosinates, alkyl phosphates, alkyl ether phosphates, alkyl ether carboxylates, and alpha olefin sulphonates, preferably sodium lauryl sulphate,
ii. non-ionic surfactants such as ethoxylated fatty alcohols, mono- or di-alkyl alkanolamides and alkyl polyglucosides,
iii. amphoteric surfactants such as alkyl amine oxides, alkyl betaines, alkyl amidopropyl betaine, alkylsulphobetaines, alkyl glycinates, alkyl amphopropionates and alkyl amidopropylhydroxysultaines.
iv. polyether polyols, hydrocarbon-containing molecules, silicone-containing molecules, hydrophobic esters,
v. non-ionic surfactants,
vi. polyoxiranes,
vii. or mixtures thereof.

By way of ionic surfactants, there may be mentioned non-limitatively alkyl ether sulphonates, hydroxyalkyl ether sulphonates, alpha olefin sulphonates, alkylbenzene sulphonates, alkyl ester sulphonates, alkyl ether sulphonates, hydroxyalkyl ether sulphates, alpha olefin sulphates, alkyl benzene sulphates, alkyl amide sulphates, as well as alkoxylated derivatives thereof (in particular ethoxylated (EO) and/or propoxylated (PO)), the corresponding salts or mixtures thereof. By way of ionic surfactants, there may also be mentioned non-limitatively saturated or unsaturated fatty acid salts and/or alkoxylated derivatives thereof, in particular (EO) and/or (PO) (such as for example sodium laurate, sodium palmitate or sodium stearate, sodium oleate), sulphonated methyl and/or sodium alpha laurates, alkyl glycerol sulphonates, sulphonated polycarboxylic acids, paraffin sulphonates, N-acyl-n-alkyltaurates, alkyl phosphates, alkyl succinamates, alkyl sulphosuccinates, sulphosuccinate monoesters or diesters, and alkyl glucoside sulphates. By way of ionic surfactants, there may be mentioned non-limitatively ethoxylated fatty alcohols, alkoxylated alkylphenols (particularly in particular (EO) and/or (PO)), aliphatic alcohols, more particularly, the products resulting from the condensation of ethylene oxide or propylene oxide with propylene glycol or ethylene glycol, the products resulting from the condensation of ethylene oxide or propylene oxide with ethylenediamine, alkoxylated fatty acid amides (in particular (EO) and/or (PO)), alkoxylated amines (in particular (OE) and/or (OP)), alkoxylated amidoamines (in particular (OE) and/or (OP)), amine oxides, alkoxylated terpene hydrocarbons (in particular (OE) and/or (OP)), alkyl polyglucosides, amphiphilic polymers or oligomers, ethoxylated alcohols, sorbitan esters or ethoxylated sorbitan esters. By way of amphoteric surfactants, there may be mentioned non-limitatively betaines, imidazoline derivatives, polypeptides or lipoamino acids. More particularly, the suitable betaines according to the invention can be selected from cocamido propyl betaine, dodecyl betaine, hexadecyl betaine, octadecyl betaine, phospholipids and derivatives thereof, amino acid esters, water-soluble proteins, esters of water-soluble proteins and mixtures thereof. By way of cationic surfactants, there may also be mentioned non-limitatively amino-laurate oxide, amino propyl cocoate oxide, caprylamphocarboxy glycinate, lauryl propionate, lauryl betaine, bis (2-hydroxyethyl) tallow betaine. According to a particular embodiment of the invention, the non-ionic foaming agent can be combined with at least one anionic or cationic or amphoteric foaming agent.

By way of amphiphilic surfactants, there may be mentioned non-limitatively polymers, oligomers or copolymers that are at least miscible in aqueous phase. The amphiphilic polymers or oligomers can have a random distribution or a multiblock distribution. The amphiphilic polymers or oligomers used according to the invention are selected from block polymers containing at least one hydrophilic block and at least one hydrophobic block, the hydrophilic block being obtained from at least one non-ionic and/or anionic monomer. By way of example of such amphiphilic polymers or oligomers there may be mentioned in particular the polysaccharides having hydrophobic groups, in particular alkyl groups, polyethylene glycol and derivatives thereof. By way of amphiphilic polymers or oligomers, there may also be mentioned polyhydroxystearate—polyethylene glycol—polyhydroxystearate triblock polymers, acrylic polymers, branched or not, or the hydrophobic polyacrylamide polymers.

With regard to non-ionic amphiphilic polymers, more particularly alkoxylated, (in particular (EO) and/or (PO)), the latter are more particularly selected from the polymers that are at least partially (at least 50% by weight) miscible in water. By way of example of polymers of this type, there may be mentioned inter alia, polyethylene glycol/polypropylene glycol/polyethylene glycol triblock polymers. Preferably, the foaming agent used according to the invention is a protein, in particular a protein of animal origin, more particularly keratin, or a protein of plant origin, more particularly a water-soluble wheat, rice, soya or cereal protein. By way of example, there may be mentioned sodium laurate of wheat protein hydrolysate, laurate of oat protein hydrolysate, or sodium cocoyl apple amino acids. Preferably, the foaming agent used according to the invention is a protein with a molecular weight of which is comprised from 300 to 50,000 Daltons. The foaming agent is used according to the invention at a ratio of 0.001 to 2, preferably 0.01 to 1, more preferably 0.005 to 0.2% by weight of foaming agent with respect to the weight of the binder.

—A4— Secondary Binder

In a preferred embodiment of the invention, the composition comprises at least one secondary binder —A4— different from the binder —A1— and selected from Portland cements, slags, geopolymer cements, natural pozzolans, sodium silicates, potassium silicates, lithium silicates, organic binders or mixtures thereof.

For example, an artificial Portland cement suitable as the secondary binder A4 comprises
20% to 95% clinker containing:
50% to 80% C 3S;
4% to 40% C 2S;
0% to 20% C4AF; and
0% to 2% C 3A;
0% to 4% S;
0% to 80% blast furnace slag, silica fume, pozzolans and/or fly ashes.

According to a variant, A4 is an organic binder selected from the group comprising—ideally constituted by—: redispersible polymer powders, epoxy (co)polymers, (co)polyurethanes, and mixtures thereof.

According to a remarkable feature of the invention, the composition also comprises:
—A5— a lubricating mineral filler with a particle size d90 less than 100 µm;
—A6— a mineral spacing filler with a particle size d90 greater than or equal to 100 µm;
and, optionally, one or more additives.

—A5— Lubricating Mineral Filler

The lubricating mineral filler with a particle size d90 less than 100 µm is preferably selected
from natural and synthetic silica-containing minerals and even more preferably from clays, micas, kaolins and metakaolins, silica fumes, fly ashes and mixtures thereof,
from calcareous or silica-calcareous fillers,
from fly ashes,
or from mixtures thereof.

—A6— Spacing Mineral Filler

The spacing mineral filler with a particle size d90 greater than or equal to 100 µm is preferably selected from siliceous, calcareous or silico-calcareous sands, light fillers, which are more particularly selected from vermiculite, expanded or not, perlite, expanded or not, glass beads, expanded or not, [hollow glass beads (3M® type) or expanded glass granules (Poraver®, Liaver®)], silica aerogels, polystyrene, expanded or not, cenospheres (fillites), hollow alumina beads, clays, expanded or not, pumices, silica-containing foam grains, rhyolite (Noblite®), or mixtures thereof.

—A7— Water-Repellent Additive

The waterproofing agent is preferably selected from the group comprising, or even better constituted by, agents containing fluorine, silane, silicone and siloxane, fatty acid metal salts and mixtures thereof, preferably from sodium, potassium and/or magnesium salts of oleic and/or stearic acid and mixtures thereof.

—A8— Retarding Additive

The retarder is preferably selected from the group comprising, or even better constituted by, calcium chelating agents, carboxylic acids and salts thereof, polysaccharides and derivatives thereof, phosphonates, lignosulphonates, phosphates, borates, and lead, zinc, copper, arsenic and antimony salts, and more particularly from tartaric acid and salts thereof, preferably the sodium or potassium salts thereof, citric acid and salts thereof, preferably the sodium salt thereof (trisodium citrate), sodium gluconates; sodium phosphonates; sulphates and the sodium or potassium salts thereof, and mixtures thereof.

—A9— Accelerating Additive:

The accelerator is preferably selected from the group comprising, or even better constituted by, alkali and alkaline earth salts of hydroxides, halides, nitrates, nitrites, carbonates, thiocyanates, sulphates, thiosulphates, perchlorates of silica, aluminium, and/or from carboxylic and hydrocarboxylic acids and salts thereof, alkanolamines, insoluble silica-containing compounds such as silica fumes, fly ashes or natural pozzolans, silica-containing quaternary ammoniums, finely divided mineral compounds such as silica gels or finely divided calcium and/or magnesium carbonates, and mixtures thereof; this additional accelerator preferably being selected from the group comprising, or even better constituted by, chlorides and the sodium or calcium salts thereof, carbonates and the sodium or lithium salts thereof, sulphates and the sodium or potassium salts thereof, calcium hydroxides and formates and mixtures thereof.

—A10— Thickening Additive:

A 10 is a different additive from A2, making it possible to improve the yield point of the mortar (slump resistance).

Preferably, this thickening additive is selected from the group comprising, or even better constituted by, polysaccharides and derivatives thereof, polyvinyl alcohols, mineral thickeners, linear polyacrylamides and mixtures thereof.

—Binder A Compositions:

In an embodiment, the composition according to the invention is characterized in that the binder A comprises—in dry weight/weight % and in increasing order of preference—:
  —A1— primary binder: [5-95]; [10-85]; [15-75];
  of which:
    lime: [10-95]; [20-70]; [30-60];
    alumina source and/or calcium sulphate source: [0-90]; [5-30]; [7-15];
  —A2— water-retaining agent: [0.1-5]; [0.5-3]; [0.8-2];
  —A3— surfactant [0-2]; [0.01-1]; [0.05-0.5];
  —A4— secondary binder [0-85]; [5-50]; [7-15];
  —A5— lubricating mineral filler with a particle size d90 less than 100 µm: [0-40]; [0-30]; [0-20];
  —A6— mineral spacing filler with a particle size d90 greater than or equal to 100 µm: [0-40]; [0-35]; [0-30];
  —A7— water-repellent additive: [0-1.5]; [0-1]; [0-0.5];
  —A8— retarding additive: [0-3]; [0-2]; [0-1];
  —A9— accelerating additive: [0-3]; [0-2]; [0-1];
  —A10— thickening additive: [0-2]; [0.1-1]; [0.2-0.8].

In another embodiment, the composition according to the invention is characterized in that the binder A comprises—in dry weight/weight % and in increasing order of preference—:
  —A1— primary binder: [5-95]; [10-85]; [15-75];
  of which:
    lime: [10-95]; [20-70]; [30-60];
    alumina source and/or calcium sulphate source: [1-90]; [5-30]; [7-15];
  —A2— water-retaining agent: [0.1-5]; [0.5-3]; [0.8-2];
  —A3— surfactant: [0.01-1]; [0.05-0.5];
  —A4— secondary binder [0-85]; [5-50]; [7-15];
  —A5— lubricating mineral filler with a particle size d90 less than 100 µm: [0-40]; [0-30]; [0-20];
  —A6— mineral spacing filler with a particle size d90 greater than or equal to 100 µm: [0-40]; [0-35]; [0-30];
  —A7— water-repellent additive: [0-1.5]; [0-1]; [0-0.5];
  —A8— retarding additive: [0-3]; [0-2]; [0-1];
  —A9— accelerating additive: [0-3]; [0-2]; [0-1];
  —A10— thickening additive: [0-2]; [0.1-1]; [0.2-0.8].

—B— Biosourced Filler

This biosourced filler typical of the compositions according to the invention is of animal or plant origin, preferably plant.

When it is of plant origin, the filler —B— is essentially composed of cellulose, hemicellulose and/or lignin, said filler preferably comprising
  at least one component—fibres, fibrils, dusts, powders, chips,
  said component being:
    originating from at least a part of at least one plant raw material,
    in at least a particulate form,
  this plant raw material preferably being selected from the group comprising—or even better constituted by, hemp, flax, cereal straw, oat, rice, maize, canola seed, maize, sorghum, flax shives, miscanthus (elephant grass), rice, sugar cane, sunflower, kenaf, coconut, olive stones, bamboo, wood (e.g. wood pellets, for example spruce chippings), sisal, cork (beads) or mixtures thereof.

By way of example of plant raw materials components, there may be mentioned: seed, stem, trunk, branch, leaf, flower, fruit, stone, stem, hull, husk, bark, bagasse, corn cob, etc.

By way of example of particulate forms of plant raw material there may be mentioned: fibres, fibrils, dusts, powders, chips, hairs, shives, etc.

These plant raw materials are natural, porous and rich in organic matter (celluloses, hemicelluloses, lignins, etc.). They are produced by industrial chipping, crushing, grinding and separation methods.

The biosourced filler —B—, preferably of plant origin, is advantageously constituted by particles in various forms.

According to the invention, a distinction is made between at least two categories of filler (B1, B2) depending on the particulate forms thereof:
  B1: acicular particles, comprising in particular: hemp, hemp chaff, flax, cereal straw, oat straw, rice straw, canola seed, maize stem husk, cotton, sorghum, flax shives, miscanthus, rice, sugar cane, sunflower, kenaf, coconut, olive stones, bamboo, wood (e.g. wood pellets, for example spruce chippings), sisal,
  B2: non-acicular particles, comprising in particular maize husk, cork pellets.

To enhance the "pumpability" and homogeneity of the wet composition ready for application to a vertical or horizontal substrate or in formwork or a mould, it is beneficial for the particles of filler —B—, preferably of plant origin, to be non-acicular (B2), that is for example, granular and rounded.

According to a variant, a filler of plant origin of the composition according to the invention comprises acicular particles of the hemp chaff, flax skives, etc. type.

Intermediate Products

A subject of the invention, as a new product, is also a partially biosourced binder —A— for construction materials, this binder being intended in particular for the composition according to the invention.

Preferably, this binder A according to the invention comprises—in dry weight/weight % and in increasing order of preference—:
- —A1— primary binder: [5-95]; [10-85]; [15-75];
  of which:
  - lime: [10-95]; [20-70]; [30-60];
  - alumina source and/or calcium sulphate source: [0-90]; [5-30]; [7-15];
- —A2— water-retaining agent: [0.1-5]; [0.5-3]; [0.8-2];
- —A3— surfactant: [0.01-1]; [0.05-0.5];
- —A4— secondary binder [0-85]; [5-50]; [7-15];
- —A5— lubricating mineral filler with a particle size d90 less than 100 μm: [0-40]; [0-30]; [0-20];
- —A6— mineral spacing filler with a particle size d90 greater than or equal to 100 μm: [0-40]; [0-35]; [0-30];
- —A7— water-repellent additive: [0-1.5]; [0-1]; [0-0.5];
- —A8— retarding additive: [0-3]; [0-2]; [0-1];
- —A9— accelerating additive: [0-3]; [0-2]; [0-1];
- —A10— thickening additive: [0-2]; [0.1-1]; [0.2-0.8].

By way of new product, the invention also relates to a kit containing the aforementioned binder —A— and the plant filler —B— as defined above.

Wet Composition

According to another aspect thereof, the invention relates to a wet construction composition formed by a mixture of the dry composition according to the invention, mixed with a liquid, preferably water.

According to a remarkable feature of the invention, this wet composition is pumpable in a screw pump with an air gap (E) between the rotor (20) and the stator (18) comprised between 4 and 30 mm. The reference signs refer to the single FIGURE attached. Such an air gap preferably corresponds to a commercially available jacket of the 2L6 or 2R6 type.

Method for Preparing the Wet Composition

The present invention also relates to a method for preparing the wet composition as defined above. This method consists of mixing a liquid, preferably water, with the dry construction compound as defined above, advantageously in a weight ratio [water/Binder —A—] greater than or equal to 0.8, preferably greater than 1, preferably greater than 1.5.

This mixture can be made by any appropriate conventional device known to a person skilled in the art.

This can be a planetary mixer or fixed auger (vertical or horizontal) mixer or a concrete mixer. The mixing device may or may not be installed directly on the machine comprising the screw pump and used to apply the wet composition by spraying or pouring.

Machine for Pumping and Spraying the Aforementioned Wet Construction Composition The machines under consideration herein are "screw pumps", preferably:
- of the type used for spraying façade render (such as Lancy PHB-R, Bunker S8 Smart, Urban Volta, Spritz S28R, Spritz S38, Turbosol UNI30, Putzmeister SP11, S5 or SP5);
- or concrete pumps (of the Bunker B100 type).

Patent application WO97/45461A1 describes an example of this type of "screw pump". The latter generally comprises a suction chamber and a discharge port arranged respectively at each end of a stator, inside which is arranged a single-helix helical rotor suitable for working with a double-helix stator. The stator is preferably constituted by an elastomer material, while the rotor 18 is advantageously made from metal. The latter is rotatably mobile about its axis via appropriate drive and transmission means. U.S. Pat. Nos. 2,512,764 and 2,612,845 are examples, inter alia, of sources of information on the detailed structure of these screw pumps.

The attached single FIGURE shows a simplified diagram of a screw pump comprising a stator tube 16, a stator 20 with a through-bore 36 in which a rotor 18 is rotatably mobile. This stator tube 16/stator 20 has a suction end 32 and a discharge end or discharge port 34. When the rotor 18 rotates inside the bore 36 of the stator 20, cavities 30 are formed between the rotor 18 and the stator 20. These cavities 30 progress from the suction end 32 to the discharge end or port 34. The cavities 30 have a length defined by the pitch of the helix of the rotor 18 and by a maximum height or air gap E shown in the single FIGURE. This air gap E can for example vary between 1 and 50 mm, preferably 4 to 30 mm.

This stator tube 16/stator 20/rotor 18 assembly is also known as a jacket.

The jackets/stators commonly mounted on façade render spraying machines are, for example, of the "2L6" or 2R6 type or the 2R8 type (compatible with the Bunker B100 concrete pump).

Method for Applying this Wet Composition

The present invention also relates to a method for applying the wet composition as defined above (steps 1, 2 and 3 {3.1, 3.2 or 3.3}):

Preferably, the wet mortar is applied by spraying by means of a machine called a "renderer's" spraying machine, comprising a screw pump.

For a biosourced filler —B— smaller than 10 mm, the spraying machine is advantageously a machine of the Putzmeister S5, SP5, SP11, Bunker S8, S28R, S38, Lancy PH9B or PH9B-R, or Turbosol Talent DMR type, this machine comprising a screw pump fitted with a 2L6 or 2R6 type rotor-stator.

For a biosourced filler —B— larger than or equal to 10 mm and smaller than 30 mm, the spraying machine is advantageously a machine of the Bunker B100 and CL18, Putzmeister SP20, Lancy TB20, or Turbosol Silant 300 CL type, this machine comprising a screw pump fitted with a 2L8 or 2R8 type rotor-stator.

1. Preparing a Mixture of Liquid—Preferably Water—, and the Dry Composition According to the Invention.

The mortar is mixed in the drum of the machine when it has one, or in a concrete mixer, as described below, preferably:
- —a— Mixing 100 L of the biosourced filler —B— with the mixing water (all of the water minus approximately 2 L) for at least one minute.
- —b— Introducing all of the binder and then mixing for approximately five minutes, adjusting the viscosity by adding water, if required. The mortar viscosity obtained must enable good flow into the pumping tank (mortar settling horizontally under its own weight) while maintaining a threshold enabling 5 cm slump resistance.
- —c— Transferring the mixture to the tank of the screw pump.

2. Pumping the Mixture Prepared in Step 1 by Means of a Screw Pump

So-called "renderer's" spraying machines generally comprise a hose for pumping the wet mortar formulation, upstream of the screw pump, and downstream of it, a spray hose the free end of which is fitted with a spray gun.

Preferably, before the screw pump is started, a slurry of the binder (e.g. between 1 and 50 kg, approximately 10 kg) is preferably introduced into the pumping hose in order to "grease" and "lubricate" said hose.

The screw pump is preferably set beforehand, using water, to a pressure for example from 1 to 20 bar: approximately 5 bar for a 2L6 jacket or from 1 to 20 bar: approximately 3 bar for a 2L8 jacket.

For a 2L6 or 2R6 jacket, the spray hose comprises for example a first portion with an inner cross-section of, for example, 15 to 50 mm, 35 mm, over a length of for example 5 to 30 m, approximately 13 m, and a second portion with an inner cross-section of, for example 15 to 50 mm, 25 mm, and a length of, for example, 1 to 10 m, 5 m.

For a 2L8 or 2R8 jacket, the spray hose has for example an inner cross-section of 50 mm over a length of 10 m.

3. Spraying the Mixture Prepared in Step 1

For spraying, the spray gun is advantageously supplied with compressed air.

Hardened Mortars

The invention relates to hardened mortars obtained from the aforementioned wet composition. These hardened mortars advantageously have a thermal conductivity λ (lambda) less than or equal to—in W/m·K and in increasing order of preference—0.15; 0.12; 0.1; 0.08; 0.07.

ETI/ITI Systems

The invention relates to an External Thermal Insulation (ETI) or Internal Thermal Insulation (ITI) system comprising hardened mortar as set out above and applied in layer(s) over a total thickness comprised between 2 and 30 cm, preferably between 5 and 15 cm, and coated with a waterproof render at least 10 mm thick. This system is characterized in that the hardened mortar comprises lime and at least one alumina source and in that it meets the test for ETI in accordance with EOTA standard ETAG 004.

The waterproof render advantageously complies with NF EN 998-1. It is preferably selected from OC1 types of render. It is for example applied after a minimum of 24 hours following the application of the last pass of biosourced insulating mortar.

Building or Civil Engineering Structures

The invention also relates to building structures obtained after application by spraying or moulding or by on-site assembly of items prefabricated using the composition according to the invention.

Further details and advantageous features of the invention will become apparent below from the description of embodiments of the invention.

EXAMPLES

Pumpability Test T1:

Test T1 consists of carrying out a test passage of a wet formulation obtained using the mortar composition for testing, through a renderer's spraying machine fitted with a screw pump.

For a category B2 biosourced filler, or smaller than or equal to 10 mm, a screw pump fitted with a 2L6 type rotor-stator mounted on a machine of the Putzmeister SP11 type is used, For a category B1 biosourced filler, larger than 10 mm and smaller than 30 mm, a screw pump fitted with a 2L8 rotor-stator mounted on a Bunker B100 machine, with integral mixer, is used.

The mortar is mixed in the machine drum as follows:
1. Mixing 100 L of biosourced filler —B— with almost all of the mixing water for one minute, with a water to A ratio comprised between 0.8 and 5.
2. Introducing all of the binder —A— and then mixing for five minutes, adjusting the viscosity by adding a small quantity of water if required, so that the viscosity of the mortar obtained enables it to flow into the pumping tank of the screw pump in less than one minute.
3. Transferring the mixture to the tank of the screw pump.
4. Adjusting the screw pump beforehand by tightening, while passing water into the jacket, to obtain a pressure at the jacket outlet of approximately 5 bar for a 2L6 jacket or approximately 3 bar for a 2L8 jacket.
5. Pumping the mixture present in the tank of the screw pump.

The composition for testing is considered to be pumpable if the screw pump does not become blocked, that is, it is observed that the wet mortar formulation is not expelled at the screw pump outlet or phase separation is observed between the biosourced filler —B— and the binder phase, at the screw pump outlet.

By "not expelled" is meant wet formulation is output for at least 30 minutes, in a quantity less than one litre.

By "phase separation" is meant the separation between the interstitial liquid and the granular phase of the mortar. The jamming or clogging of the pump is a consequence of the separation between the liquid phase and the granular network when the product is passed through a confined space. This phase separation will result in the occurrence of direct contact between aggregates (in particular the particles of filler —B—), hence the blockage.

This test is carried out at ambient temperature and pressure.

Measurement Method M1 Giving the "Hardening" Time of a Biosourced Mortar and making it Possible to Estimate the Recoat Time The recoat time is linked to the hardening of the biosourced mortar. The hardening time corresponds to the acquisition of compressive strength (NF EN 1015-11) greater than or equal to 0.1 MPa, enabling the removal from the mould of a 4×4×16 cm test piece.

Protocol:
1. The product is mixed using a planetary mixer with a vertical auger as specified in NF EN 196-1.
   a) The plant filler B is mixed with almost all of the mixing water for one minute, at a speed of 120 rpm, with a water to A ratio comprised between 0.8 and 5.
   b) The binder is added and then mixed for 300 seconds at a speed of 120 rpm. The viscosity is adjusted by adding a small quantity of water, if required, so that the mixed mortar can flow into a mould in step 2 in less than 30 seconds.
2. After mixing, the mortar is poured into metal moulds measuring 4×4×16 cm.
3. The test pieces are then stored at 20° C. and 50% RH.
4. The "hardening" time corresponds to the moment when the cohesion of the test piece enables it to be removed from the mould without damage.

By "damage" is meant cracking and/or partial or total failure of the test piece.

Measurement Method M2 Measurement of the Water Retention Time of a Biosourced Mortar This method M2 corresponds to an adaptation of the method known as filter method.

Apparatus:
Metal mould.
  Inner dimensions:
    Top diameter: 100 30 5 mm.
    Bottom diameter: 80+/−5 mm.
    Height: 25+1 mm.
  Outer dimensions:
    Diameter: 120+/−5 mm.
    Height: 30+1 mm.

Spatula

Glazed tile (size: approximately 120 mm×5 mm)

Balance accurate to 0.01 g 100 mm diameter filter paper (Schleicher or filtre-Lab 0965 NW 25 L): separating filter.

(i). 100 mm diameter filter paper (Schleicher 2294 or filtre-Lab S-Type 600)

Protocol:

1. The sample is prepared according to the mixing method described in test T2.
2. Weigh the empty, dry mould➔ $m_A$.
3. Weigh the Schleicher 2294 or filtre-Lab S-Type 600 filter paper➔ $m_B$.
4. Fill the mould with the hemp mortar using a spatula. Overfill slightly to ensure contact between the filter and the paste.
5. Weigh the filled mould➔ $m_C$.
6. Cover the paste with the separating filter paper (Schleicher or filtre-Lab 0965 NW 25 L) and then place the 2294 or S-600 filter on the assembly.
7. Place the glazed tile on the assembly, turn the assembly upside down and start the timer. The test duration is 15 minutes.
8. After 15 minutes, retrieve the 2294 or S-600 filter paper and weigh it➔ $m_D$.

Expression of Results:

Calculation 1: mass of water contained in the product $$Mwater=((m_C-m_A)*Tg \%)/(100+Tg \%)$$

Calculation 2: water loss from the product $$\Delta water=(m_D-m_B)$$

Calculation 3: Water retention as a %

$$R\% = ((Mwater - \Delta water)/Mwater)*100$$

EN 1015-8: *Methods of test for mortar masonry—Part 8: Determination of water retentivity of fresh mortar.* (September 1999)

Raw Materials

Binder A

A1:

HYDRAULIC LIME HL 3.5, LAFARGE

SULPHOALUMINATE CEMENT, I.TECH ALI CEM, ITALCEMENTI;

A2:

CULMINAL C8367, WATER-RETAINING AGENT, METHYL HYDROXYETHYL CELLULOSE, VISCOSITY 32,000-40,000 MPA·S, ASHLAND AQUALON;

A3:

NANSA LSS 495/H, SURFACTANT, SODIUM ALPHA OLEFIN SULFONATE, HUNTSMAN;

A5:

SILICA FUME, RW SILICIUM GMBH;

A6:

PORAVER, EXPANDED GLASS GRANULES, GRANULE SIZE IN MM 01-03, PORAVER GMBH;

SILICEOUS SAND, 0.1/0.4 SIBELCO FRANCE

A7:

OPTIGEL WM, ORGANICALLY MODIFIED BENTONITE, ROCKWOOD ADDITIVES.

FILLER —B—:

"KANABAT" hemp chaff for building: Category B1 particulate form, particle size variable between 10 and 30 mm.

Comparative Example 1

Formula according to the prior art (for example Tradical® PF70).

Tradical PF70, produced by Balthazard et Cotte Batiment (Lhoist group) comprises approximately 75% hydraulic lime, 15% hydraulic binder and 10% pozzolanic material.

The conclusions of the test according to method T1 are:

Blockage of the machine due to phase separation. Retention according to T3 is less than 90%:

Hardening time greater than 48 hrs measured according to T2.

| COMPARATIVE EXAMPLE | | 1 |
|---|---|---|
| Spraying machine | | BUNKER B100 |
| Jacket used | | 2L8 |
| Description of formula | | Prior art TRADICAL PF70 |
| Binder matrix [kg] | | 33 |
| B. Filler labelled KANABAT "hemp chaff for building": | | |
| Volume [L] | | 100 |
| Weight [kg] | | 10 |
| Filler B/Binder A volume/weight ratio [L/kg] | | 3.03 |
| Filler B/Binder A weight/weight ratio [kg/kg] | | 0.3 |
| Water [L] | | 42 |
| Water/Binder A weight ratio | | 1.27 |
| Binder matrix composition | | |
| A Binder | TRADICAL PF70 (BCB) | 100% |
| Application observations | | |
| Passage through machine/pumping during test T1 | | Pump blockage/phase separation |
| Properties in hardened state | | |
| Density [kg/m³] | | — |
| Thermal conductivity [W/m · K] | | — |

Examples 2, 3, 4

In these examples, the dry hemp mortar compositions have the same filler B/binder A ratio [L/kg]. They are applied with a spraying machine fitted with screw pump (BUNKER B100) using a 2L8 jacket. All of the compositions are pumpable according to T1.

| EXAMPLES | | 2 | 3 | 4 |
|---|---|---|---|---|
| Spraying machine | | BUNKER B100 | BUNKER B100 | BUNKER B100 |
| Jacket used | | 2L8 | 2L8 | 2LB |
| Description of formula | | Without spacing mineral fillers | With spacing mineral fillers | With spacing mineral fillers |
| Binder matrix [kg] | | 25 | 25 | 25 |
| B. Filler labelled KANABAT "hemp chaff for building": | | 100 | 100 | 100 |
| | | 10 | 10 | 10 |
| Volume [L] | | | | |
| Weight [kg] | | | | |
| Filler B/Binder A volume/weight ratio [L/kg] | | 4 | 4 | 4 |
| Filler B/Binder A weight/weight ratio [kg/kg] | | 0.4 | 0.4 | 0.4 |
| Water [L] | | 38 | 38 | 34 |
| Water/Binder weight ratio | | 1.52 | 1.52 | 1.36 |
| Binder matrix composition | | | | |
| A.1 Main mineral binder | Hydraulic Lime HL 3.5 (Lafarge) | 80% | 87.88% | 67.88% |
| A.2 Water-retaining agent | MHEC CULMINAL | 1.5% | 1.13% | 1.13% |

-continued

| EXAMPLES | | 2 | 3 | 4 |
|---|---|---|---|---|
| A.3 Surfactant | C8367 (Ashland) NANSA LSS 495/H (Huntsman) | 0.09% | 0.09% | 0.09% |
| A.10 Thickening Additive | OPTIGEL WM (Tolsa) | 0.90% | 0.90% | 0.90% |
| A.6 Spacing mineral filler | PORAVER 01-03 Siliccous Sand DU 01-04 | | 7.89% | 20% |
| A.5 Lubricating mineral filler | SILICA FUME | 10% | 10% | 10% |
| Application observations | | | | |
| Passage through machine/ pumping during test T1 | | Passage through machine satisfactory | Passage through machine satisfactory | Passage through machine satisfactory |
| Properties in hardened state | | | | |
| Density [kg/m³] | | — | 400 | — |
| Thermal conductivity [W/m · K] | | — | 0.08 | — |

Examples 5 and 6

Examples of hemp mortar-based insulation systems subjected to ageing tests in accordance with the EOTA external thermal insulation standard, ETAG 004 for external thermal insulation. The insulation systems are composed of 10 cm of hemp mortar and a water-resistant lime finishing render (PAREXAL-PAREXGROUP SA). The hemp mortars have the same Filler B/Binder A ratios (100 L/25 kg) but differ in the formula of the binder A.

The formula in example 6 differs from the formula in example 5 solely through the presence of 10% sulphoaluminate cement (i.tech ALI CEM).

With the addition of a sulphoaluminate cement, the insulation system in example 6 successfully withstood the ageing cycles described in ETAG 004 for ETI systems. The recoat time between two passes of hemp-based insulating mortar is 24 hrs-48 hrs depending on the weather conditions, instead of 3-7 days for the formula in example 5 without sulphoaluminate cement.

Recoatability corresponds to the possibility of applying a fresh coat onto an initial coat that is touch-dry, so that it withstands the deformation caused by the application of this fresh coat.

| EXAMPLES | 5 | 6 Preferred example |
|---|---|---|
| Spraying machine | BUNKER B100 2L8 | BUNKER B100 2L8 |
| Jacket used | | |
| Description of formula | Without CSA cement | With CSA cement |
| Binder A [kg] | 25 | 25 |
| B. Filler labelled KANABAT "hemp chaff for building": Volume [L] | 100 | 100 |
| Weight [kg] | 10 | 10 |
| Filler B/Binder A volume/ weight ratio [L/kg] | 4 | 4 |
| Filler B/Binder A weight/ weight ratio [kg/kg] | 0.4 | 0.4 |

-continued

| EXAMPLES | | 5 | 6 Preferred example |
|---|---|---|---|
| Water [L] | | 38 | 36 |
| Water/Binder A weight ratio | | 1.52 | 1.44 |
| Binder A composition | | | |
| A1. Main mineral binder | Hydraulic Lime HL 3.5 (Lafarge) | 68.78% | 58.78% |
| | Sulphoaluminate cement, i.tech ALI CEM (Italcementi) | | 10% |
| A2. Water-retaining agent | MHEC CULMINAL C8367 (Ashland) | 1.13% | 1.13% |
| A3. Surfactant | NANSA LSS 495/H (Huntsman) | 0.09% | 0.09% |
| A.6. Spacing mineral filler | Siliceous sand DU 0.1-0.4 | 20% | 20% |
| A.5. Lubricating mineral filler | SILICA FUME | 10% | 10% |
| Test wall applied in accordance with ETAG 004 | | | |
| Thickness of hemp chaff-based insulating mortar | | 10 cm | 10 cm |
| Scratch finish lime render (PAREXAL-PAREXGROUP SA) | | 1 cm | 1 cm |
| Recoat time between passes of hemp mortar | | 3-7 days | 1-2 days |
| Performance after ageing cycles in accordance with ETAG 004 | | | |
| Cracks | | Cracks appeared before and during the ageing cycles. The cracks passed through the finishing render to the insulating mortar. | No cracks appeared after the cycles |
| Bond [N/mm2] | | 0.026 | 0.22 |
| Approval of the insulation system in accordance with ETAG 004 | | System not approved: "structural" cracks (hemp mortar and finish) | System approved |
| Passage through machine/ pumping during test T1 | | Passage through machine satisfactory | Passage through machine satisfactory |

Examples 7, 8, 9

These examples show the impact of the B/A (filler/binder) ratio on the thermal conductivity of the sprayed hemp chaff-based insulating mortar. The compositions in examples 7, 8 and 9 give wet formulations that are pumpable in accordance with test T1 and have respective B/A ratios of 4, 3.3 and 2.6.

The compositions in examples 7, 8 and 9 have a hardening time measured in accordance with method M1 of less than 24 hours.

The composition in example 7 gives a lambda value<0.1 W/(m·K).

The reduction in the B/A ratio results in an increase in the thermal conductivity measured using a guarded hot plate (ambient T: 20° C., RH: 50%). For a hemp chaff-based mortar, the thermal conductivity is less than 0.1 W/m·K, if the B/A ratio (hemp chaff B/binder A) is greater than 3.33.

| EXAMPLES | 7 | 8 | 9 |
|---|---|---|---|
| Spraying machine | BUNKER B100 | BUNKER B100 | BUNKER B100 |
| Jacket used | 2L8 | 2L8 | 2L8 |
| Binder A [kg] | 25 | 30 | 37.5 |
| B. Filler labelled KANABAT "hemp chaff for building": | | | |
| Volume [L] | 100 | 100 | 100 |
| Weight [kg] | 10 | 10 | 10 |
| Filler B/Binder A volume/weight ratio [L/kg] | 4 | 3.33 | 2.6 |
| Filler B/Binder A weight/weight ratio [kg/kg] | 0.4 | 0.33 | 0.27 |
| Water [L] | 36 | 36 | 38 |
| Water/Binder A weight ratio | 1.44 | 1.2 | 1.01 |
| Binder matrix composition | | | |
| A.1 Main mineral binder — Hydraulic Lime HL 3.5 (Lafarge) | 58.78% | 69.10% | 89.51% |
| Sulphoaluminate cement, i.tech ALI CEM (Italcementi) | 10% | 10% | 10% |
| A.2 Water-retaining agent — MHEC CULMINAL C8367 (Ashland) | 1.13% | 0.80% | 0.40% |
| A.3 Surfactant — NANSA LSS 495/H (Huntsman) | 0.09% | 0.10% | 0.09% |
| A6. Spacing mineral filler — Siliceous Sand DU 01-04 | 20% | 20% | |
| A5. Lubricating mineral filler — SILICA FUME | 10% | | |
| Application observations | | | |
| Passage through machine/pumping during test T1 | Passage through machine satisfactory | Passage through machine satisfactory | Passage through machine satisfactory |
| Properties in hardened state | | | |
| Density [kg/m³] | 458 | 559 | 671 |
| Thermal conductivity [W/m.K]: measured using the hot plate method. | 0.074 | 0.100 | 0.114 |

The invention claimed is:

1. A dry mortar composition, wet-sprayable by means of a screw pump, enabling the production of an insulating mortar, the dry mortar composition comprising:
   —A— at least one binder, itself comprising:
      —A1— at least one primary binder comprising lime and at least one alumina source, wherein a dry weight ratio of the alumina source to the lime is less than or equal to 1.5;
      —A2— at least one water-retaining agent;
   —B— at least one biosourced filler of plant origin;
   the B/A ratio—the volume of dry filler —B— in litres/mass of dry binder —A— in kg—being comprised between 4 and 7.9 L/kg; wherein
   the dry mortar composition is configured such that when it is mixed with water at a water/A weight ratio comprised between 0.8 and 5, it forms a wet-sprayable composition that is pumpable in a screw pump, the wet-sprayable composition having a setting time of between 1 and 24 hours that is effective to produce an insulating mortar that has a thermal conductivity λ of less than or equal to 0.1 W/m·K;
   the biosourced filler —B— of plant origin, is essentially composed of cellulose, hemicellulose and/or lignin, said filler comprising
      at least one component, fibres, fibrils, dust, powder, chips
      said component originating from at least part of at least one plant raw material, in at least one particulate form,
   the at least one plant raw material is hemp; and
   the binder —A— comprises—in dry weight/weight %—:
      the at least one primary binder—A1—: 5-95;
      of which:
         the lime: 10-95;
         the at least one alumina source: 1-90;
      the at least one water-retaining agent—A2—: 0.1-5;
      —A3— surfactant: 0.01-1;
      —A4— secondary binder 0-85;
      —A5— lubricating mineral filler with a particle size d90 less than 100 μm: 0-40;
      —A6— mineral spacing filler with a particle size d90 greater than or equal to 100 μm: 0-40;
      —A7— water-repellent additive: 0-1.5;
      —A8— retarding additive: 0-3;
      —A9— accelerating additive: 0-3; and
      —A10— thickening additive: 0-2.

2. The composition according to claim 1, wherein the dry mortar composition further comprises water mixed therein at a water/A weight ratio comprised between 0.8 and 5.

3. The composition according to claim 1, wherein the at least one alumina source is selected from the following: geopolymer cements, slags, quick-setting cements, calcium aluminate cements (CAC), calcium sulphoaluminate (CSA) cements or mixtures of these species, used alone or in a mixture.

4. The composition according to claim 1, wherein the at least one water-retaining agent —A2— is selected from polysaccharides.

5. The composition according to claim 1, wherein the at least one secondary binder —A4— is different from the at least one binder —A1— and selected from Portland cements, quick-setting cements, slags, geopolymer cements, natural pozzolans, sodium silicates, potassium silicates, lithium silicates, organic binders or mixtures thereof.

6. Wet composition obtained from the composition according to claim 1, characterized in that it is pumpable in a machine fitted with a screw pump with an air gap (E) between the rotor (20) and the stator (18) of between 4 and 30 mm.

7. Hardened mortar obtained from the wet composition according to claim 6, characterized by a thermal conductivity $\lambda$ less than or equal to 0.15 W/m·K.

8. External Thermal Insulation (ETI) or Internal Thermal Insulation (ITI) system comprising hardened mortar according to claim 7 and applied in layer(s) over a total thickness comprised between 2 and 30 cm, and coated with a waterproof render of a minimum thickness of 10 mm, characterized in that the hardened mortar comprises lime and at least one alumina source and in that said system passes the test for ETI in accordance with EOTA standard ETAG 004.

9. Method for applying an insulating mortar comprising the following steps:
1. Preparing a mixture of water and the dry composition according to claim 1, that is, comprising the binder —A— and the filler of plant origin —B—, in the water/binder —A— weight ratio given below:

$0.8 \leq [Water/A] \leq 5;$

2. Pumping the mixture prepared in step 1 by means of a screw pump,
3.1 Spraying the mixture prepared in step 1
→onto a vertical or inclined substrate,
→to fill a timber- or metal-framed structure on site,
→for to produce prefabricated walls;
or
3.2 Spraying and spreading the mixture on a horizontal surface to form a screed;
or
3.3. Pouring the mixture prepared in step 1 into formwork to produce a wall, to fill between two partitions, or into a mould to produce a prefabricated element.

10. The composition according to claim 1, wherein the at least one water-retaining agent —A2— is selected from the group consisting of cellulose ethers; starch ethers; mixtures of cellulose ethers and starch ethers; methyl celluloses; hydroxypropyl celluloses; hydroxyethyl celluloses; methyl hydroxypropyl celluloses; methyl hydroxyethyl celluloses; mixtures of at least one of methyl celluloses, hydroxypropyl celluloses, hydroxyethyl celluloses, methyl hydroxypropyl celluloses, methyl hydroxyethyl celluloses; modified guar ethers; unmodified guar ethers; mixtures of modified guar ethers and unmodified guar ethers; and mixtures thereof.

11. The composition according to claim 2, wherein the thermal conductivity $\lambda$ is in the range of from 0.074 W/m·K to 0.08 W/m·K.

12. The composition according to claim 2, wherein the B/A ratio is in the range of from 4.6 and 7.5 L/kg.

13. The composition according to claim 1, wherein the dry weight ratio of the alumina source to the lime is less than or equal to 1.3.

* * * * *